United States Patent [19]
Suarez et al.

[11] 3,792,324
[45] Feb. 12, 1974

[54] SINGLE PHASE MOTOR STARTING CIRCUIT

[75] Inventors: Julio F. Suarez, Chagrin Falls, Ohio; Boris Mokrytzki, Murrysville, Pa.

[73] Assignee: Reliance Electric Company, Cleveland, Ohio

[22] Filed: Oct. 30, 1972

[21] Appl. No.: 302,343

[52] U.S. Cl. ............................ 318/221 E, 318/227
[51] Int. Cl. .............................................. H02p 1/44
[58] Field of Search .......318/220 R, 221 R, 221 D, 318/221 E, 227

[56] References Cited
UNITED STATES PATENTS
3,671,830  6/1972  Kruper ........................... 318/221 E
2,181,734  11/1939  Mooney ......................... 318/221 D
3,530,348  9/1970  Conner .......................... 318/227 X
3,307,093  2/1967  Wright ........................... 318/227 X Primary Examiner—Gene Z. Rubinson
Attorney, Agent, or Firm—Woodling, Krost, Granger & Rust

[57] ABSTRACT a single phase motor is started by energizing the main winding and also energizing the starting winding through a bidirectional solid state switch. A condition of the starting winding circuit is sensed such as current or voltage and compared with a reference means and when the sensing signal exceeds the reference means, the conduction through the solid state switch is terminated and remains terminated until the motor is deenergized. The foregoing abstract is merely a resume of one general application, is not a complete discussion of all principles of operation or applications, and is not to be construed as a limitation on the scope of the claimed subject matter.

19 Claims, 5 Drawing Figures

SINGLE PHASE MOTOR STARTING CIRCUIT

BACKGROUND OF THE INVENTION

The field of art to which the invention pertains is electricity, motive power systems, induction motors, control of the primary of the motor circuit, single phase, phase converter of the impedance type, automatic control. A single phase motor with a single winding will not start of its own accord since it has zero torque at zero speed. Once the motor moves in one direction or the other it builds up torque and becomes useful.

One method of starting such a motor for a particular rotational direction is to have two windings in quadrature, the main winding being normal and the starting winding having high resistance. The displacement in space of the windings and the time displacement between the currents in each winding produce a torque at standstill. This method is limited to low starting torque applications. Sometimes this starting winding is left in the circuit and at other times it is removed with an external relay or possibly a centrifugal switch.

When greater starting torques are required, a motor with quadrature windings is run with a capacitor in series with one winding. This makes the motor behave as if it were a two-phase motor which does have good starting torque. During starting the capacitor should be large to allow relatively heavy current in the starting winding at the maximum current displacement. When running, the winding impedance is different from the standstill value so that the capacitor suitable to produce a proper phase displacement at full load speed is different from that required at standstill. A smaller capacitor would enhance motor operation by raising efficiency but the optimum capacitor for starting is several times too large for running.

The customary way to operate a capacitor start motor is to disconnect the starting capacitor with a centrifugal switch when the motor reaches a preset speed. The mechanical switch is limited in the number of operations it can sustain because during the opening of the contacts, small amounts of contact materials are used up.

Because of the cost and nuisance of a centrifugal switch, it is desirable to obtain the operating signal from some other source. Solid state switches have been used as a substitute for a relay or a centrifugal switch. The prior art has shown that one such source was a current transformer in the main winding lead. Another source was an auxiliary winding in the motor itself wound on or near the main winding.

The present invention uses a signal from the auxiliary or starting winding circuit to establish an open circuit condition of the solid state switch.

An object of the invention is to establish a solid state switch which conducts bidirectionally to establish the starting winding circuit of a single phase induction motor yet which is terminated in conduction by a signal obtained from the starting winding circuit exceeding a reference value.

Another object of the invention is to provide bidirectional conduction through a starting winding circuit yet controlled by a unidirectional sensing circuit.

Another object of the invention is to provide a solid state switch in the starting circuit of a single phase induction motor with biasing means to normally effect conduction of the solid state switch and a reference compared with a signal from the starting circuit to terminate conduction of the solid state switch.

SUMMARY OF THE INVENTION

The invention may be incorporated in a motor circuit, comprising, in combination, a single phase motor having a main winding and a starting winding, first and second AC input terminals, means energizing said main winding from said input terminals, solid state switch means, a starting winding circuit connecting said starting winding to said solid state switch means and to said input terminals, condition sensing means sensing an electrical condition of said starting winding circuit and having an output, reference means, comparator means comparing the output of said condition sensing means and said reference means, and control means connected to effect conduction of said switch means for starting current through said starting winding circuit upon initial energization of said motor and controlled by said comparator means to terminate conduction of said solid state switch means upon said condition sensing means output exceeding said reference means.

Other objects and a fuller understanding of the invention may be had by referring to the following description and claims, taken in conjunction with the accompanying drawing.

DESCRIPTION OF THE PREFERRED EMBODIMENT

Figure 1:
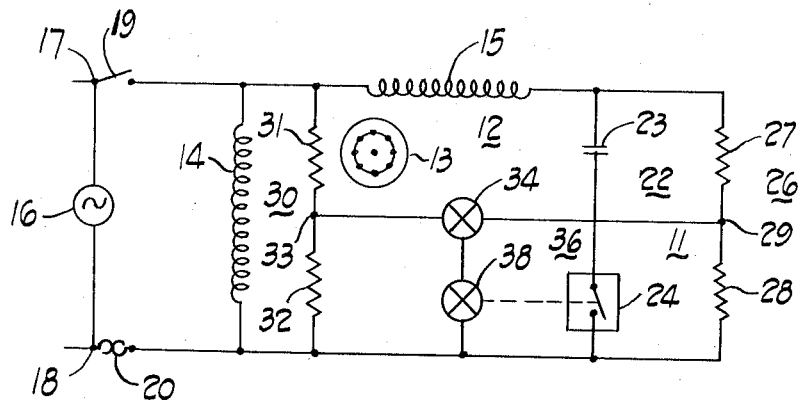
FIG. 1 is a schematic diagram of a circuit embodying the invention.

FIG. 1 is a block diagram of a motor circuit 11 incorporating the invention. The motor circuit is used with a single phase induction motor 12 which has a rotor 13, a main winding 14 and a starting or auxiliary winding 15. The motor 12 is adapted to be energized from an AC source 16 through first and second AC input terminals 17 and 18. A main switch 19 and an overload device 20 may be provided as is customary. The main winding 14 is connected directly to the input terminals 17 and 18 via the switch and overload device and the starting winding 15 is connected to these input terminals by means of a starting winding circuit 22. The starting winding circuit 22 may be a resistance split phase circuit or a capacitor start, capacitor-run circuit or may be, as shown, a capacitor-start circuit. With the capacitor-start circuit as shown in FIG. 1, a starting capacitor 23 is connected in series circuit with the starting winding 15 and with a power switch 24 across the AC input terminals 17 and 18. This power switch 24 in this preferred embodiment is a solid state switch which is capable of bidirectional conduction. Such switches are available such as a triac.

Condition sensing means 26 senses an electrical condition of the starting winding circuit and in FIG. 1 is shown as resistors 27 and 28 connected to the starting winding circuit. More specifically, they are connected in series as a voltage divider across the series combination of starting capacitor 23 and power switch 24. This condition sensing means has an output at a terminal 29 of the voltage divider formed by resistors 27 and 28.

Reference means 30 is provided as is comparator means 34. The reference means includes resistors 31 and 32 connected in series with terminal 33 therebetween across the AC input terminals 17 and 18. This reference means establishes a reference voltage value which the comparator 34 compares relative to the condition sensing means output at terminal 29.

Control means 36 is provided to control the power switch 24. This control means includes bypass means 38 with the output of the comparator 34 connected to establish conduction of the power switch 24 for starting current through the starting winding circuit 22 upon initial energization of the motor 12. The control means 36 is also controlled by the comparator 34 to terminate conduction of the power switch 24 upon the condition sensing means 26 output exceeding the reference means 30. In this circuit of FIG. 1 the termination of conduction of switch 24 is effected by the comparator turning on the bypass means 38 thus removing control electrode or gate electrode signal to the power switch 24, hence turning it off.

Figure 2:
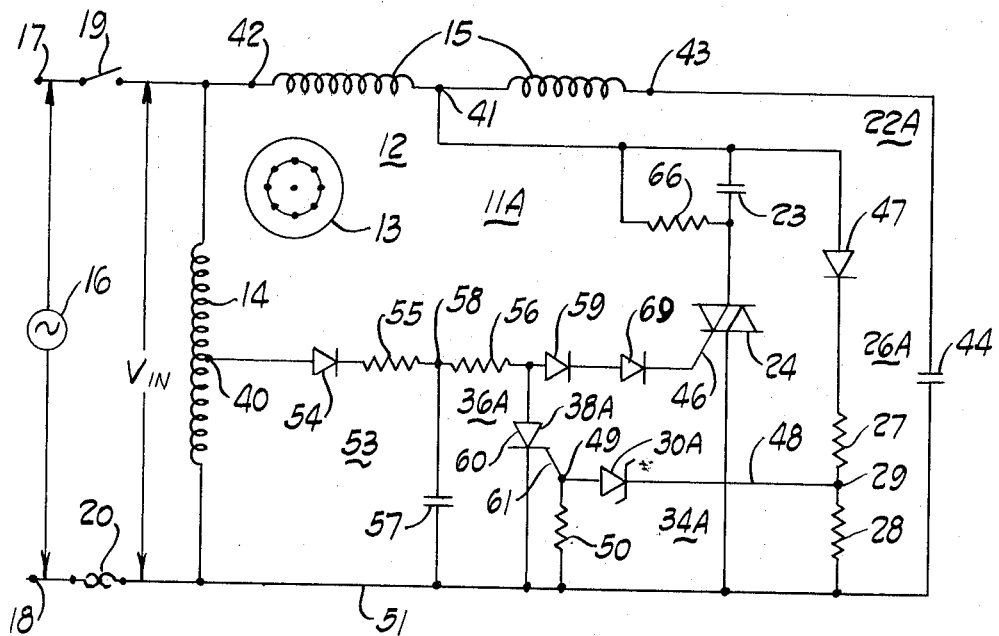
FIG. 2 is a more detailed schematic diagram of the invention.

FIG. 2 shows an actual circuit as constructed to operate an induction motor 12. This FIG. 2 shows a motor circuit 11A again operable from AC input terminals 17 and 18 through a main switch 19 and an overload device 20. The starting winding 15 has an intermediate terminal 41 and end terminals 42 and 43.

The starting winding circuit 22A is shown as a capacitor-start, capacitor-run starting circuit with a starting capacitor 23 and a running capacitor 44. The starting winding 15 and running capacitor 44 are connected in series across the input terminals 17 and 18 for energization of the entire starting winding 15 and capacitor 44 during both starting and running conditions. The starting capacitor 23 is connected in series with a triac or other bidirectional solid state switch 24 having first and second anodes and a gate or control electrode 46.

The condition sensing means 26A includes resistors 27 and 28 with terminal 29 therebetween and also includes a diode 47 to make this a unidirectional condition sensing means. It senses a voltage of the starting circuit 22A and in this case senses the voltage across the starting capacitor 23.

The reference means 30A is shown as a Zener diode which is a breakdown diode having a particular reverse voltage at which it breaks down and conducts in the reverse direction. The comparator means 34A includes a conductor 48 connecting the cathode of diode 30A to the terminal 29. It also includes a resistor 50 connected between the anode terminal 49 of diode 30A and a conductor 51 which may be considered a ground conductor connected to the AC input terminal 18.

In this motor circuit 11A the control means 36A includes a biasing signal means 53 which is connected to effect conduction of the switch means 24 for starting current through the starting winding circuit 22A upon initial energization of the motor 12. This biasing signal means 53 effects such conduction of switch 24 by establishing a power supply to make the gate 46 normally positive relative to the second anode which is connected to the ground conductor 51. This power supply includes a diode 54, resistors 55 and 56 and filter capacitor 57. This establishes a positive bias signal at the filter terminal 58 which is passed by diodes 59 and 69 to the gate electrode 46.

The control means 36A also includes a unidirectional conducting device 60, shown as a semi-conductor controlled rectifier or thyristor. Such device 60 has an anode connected to the resistor 56 and a cathode connected to the ground conductor 51. Device 60 also has a gate electrode 61 connected to the terminal 49 of the comparator means 34A.

OPERATION

The single phase induction motor 12 may be operable from commercially available voltages, for example, 120 volts, 60 Hz. The intermediate tap 41 may be at a midpoint of the starting winding 15, thereby permitting reversing of the motor 12 by interchanging the connections to the winding terminals 42 and 43. The condition sensing means 26A includes the unidirectional conducting means 47 to establish conduction only on half cycles of the AC source 16. This establishes a unidirectional voltage at the sensing means output terminal 29. As an example, this may be 20 volts determined by the ratio of resistors 27 and 28 and the voltage available from the starting winding 15. The Zener diode 30A may have a breakdown voltage related to the condition sensing voltage, for example, 20 volts.

Figure 3:
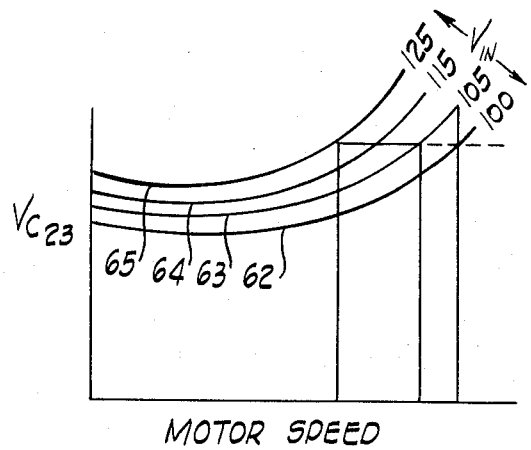
FIG. 3 is a graph of voltage versus speed.

The voltage on the starting winding 15 is dependent upon two things; namely, it is a function of the applied voltage 16 and a function of the rotating speed of the rotor 13. Accordingly, as the motor accelerates upon closing of the main switch 19, the voltage increases on the starting winding 15. It also increases on the starting capacitor 23. FIG. 3 shows a graph of voltage on the starting capacitor 23 relative to speed. A family of curves 62–65 illustrate the different voltages obtainable on the capacitor 23 for different applied voltages. Curve 62 may be for only 100 volts applied voltage from source 16 and curves 63, 64 and 65 may be for applied voltages of 105, 115 and 125 volts, respectively.

Upon initial closing of the switch 19, the motor 12 is energized. The biasing signal means 53 is energized to provide power, in this case, positive bias to the gate 46 to cause conduction of the triac 24. This energizes the starting winding circuit 22A and the motor accelerates. At some predetermined speed, for example, 75 percent of full load speed, the voltage in the starting winding circuit, as sensed by the condition sensing means 26A, will reach the reference value. In the circuit of FIG. 2 this may be, for example, 20 volts as sensed at terminal 29. The comparator 34A senses this voltage value exceeding the breakdown voltage reference value. Once the breakdown diode 30A passes current, a positive voltage appears at the terminal 49 because of current flow through resistor 50. This positive voltage triggers the thyristor 60 into conduction. This thyristor 60 is a bypass means 38A bypassing to the ground conductor 51 the positive bias signal at terminal 58. There will be a forward voltage drop of perhaps 0.7 volts across thyristor 60 but this is less than the forward voltage drops across the two diodes 59 and 69. The current through the gate ceases to flow and the triac 24 will not conduct after the next half cycle. Thereafter current to the starting winding 15 is only through the running capacitor 44 which is chosen of a value smaller than that of the starting capacitor 23 so as to increase efficiency of the motor 12. A resistor 66 is connected across the starting capacitor 23 to discharge it slowly to have this capacitor ready for the next time the motor needs to be started.

Sufficient current is bypassed through the thyristor 60 to make certain that the solid state switch 24 remains turned off until the motor is de-energized either by opening the main switch 19 or tripping the overload device 20. The condition sensing means 26A is shown connected across the starting capacitor 23 but as an alternative it could be connected across the running capacitor 44.

Figure 4:
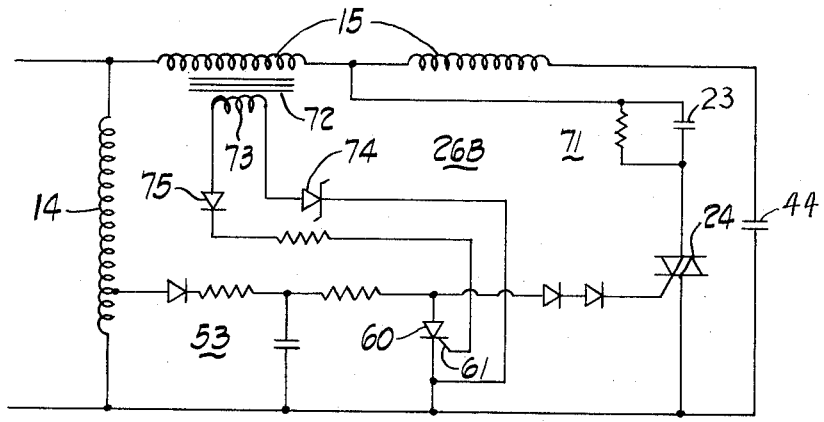
FIG. 4 is a schematic diagram of a modification.

FIG. 4 shows a modification of a motor circuit 71. This circuit may be similar to that shown in FIG. 2 in most respects. The condition sensing means 26B senses the voltage across the starting winding 15 by means of a transformer 72, the transformer being coupled to this starting winding 15. This transformer also acts as an isolation transformer. A breakdown diode 74 connects one end of the transformer secondary 73 to the cathode of thyristor 60. This transformer can be made as part of a winding, for example, as an insulated coil placed in the same slots as all or part of the auxiliary winding. A diode 75 connects the other end of the secondary 73 to the gate electrode 61 of this thyrister 60. The breakdown diode 74 is a reference means which must be exceeded by the starting winding circuit voltage exceeding the reference value. When this happens, a positive voltage is applied to the gate 61 making the bypass thyristor 60 conduct. This turns off the triac 24 which was initially energized by the biasing signal means 53 upon initial energization of the motor 12.

Figure 5:
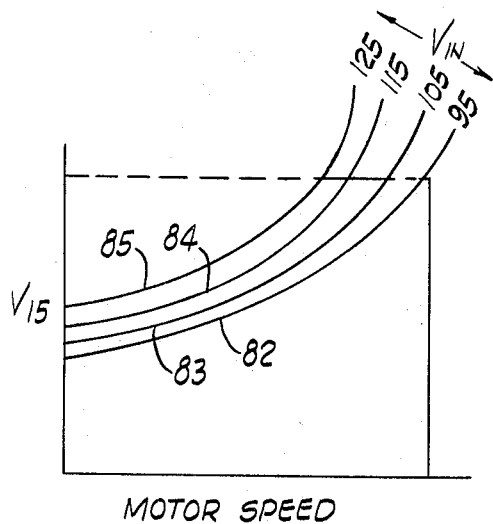
FIG. 5 is a graph of voltage versus speed of the circuit of FIG. 4.

FIG. 5 shows a family of curves 82–85 similar to those curves 62–65 of FIG. 3. These curves represent the voltage developed across one-half of the starting winding 15 relative to speed for applied voltages of 100, 105, 115 and 125, respectively.

The FIGS. 1, 2 and 4 illustrate various ways of obtaining a sensing of an electrical condition in accordance with the starting winding circuit. This electrical condition controls the conduction of a solid state switch. Such switch is biased into normal conduction upon initial energization of the motor 12. The switch is turned off whenever the condition sensing means output exceeds a reference value. This is effected by a bypass means which bypasses the bias signal normally turning on the solid state switch.

The bypass means passes enough current to make certain that there is continued cessation of current conduction through the solid state switch 24 once the condition sensing means output exceeds the reference value until the motor is deenergized.

It will be noted that the solid state switch is a bidirectional device conducting equally on alternate half cycles so long as the gate electrode 46 is maintained positive relato the second anode. However, the condition sensing means is unidirectional because of diode 47. The reference means in FIGS. 2 and 4 is also unidirectional because of the reference breakdown voltage characteristic of this breakdown diode. Also, the bypass means 38A, as established by the thyristor 60, is unidirectional. Yet this unidirectional control system is capable of controlling the bidirectional solid state switch 24.

The circuit of FIG. 2 eliminates need for any isolation transformer because all parts of the control means 36A utilize the common conductor 51 as a ground conductor. This simplifies the circuit. Such condition is established by one end of the starting winding being connected to one input terminal 17 and by the solid state switch 24 being connected to the other input terminal with the starting capacitor 23 therebetween.

The circuit of FIG. 2 also establishes protection for the triac 24. This is done by having an inductive winding connected between 41 and 43 in a loop which also includes the triac 24. This inductive means is achieved by a portion of the starting winding 15. Without inductance in the loop, the remaining charge in either capacitor 23 or 44 might cause a rapid rate of current rise, di/dt, causing early failure of the triac. By adding inductance, the di/dt can be held within values not detrimental to the triac. Accordingly, the worst surge conditions come upon the closing or opening of the switch 24 and the inductance achieved by a portion of the starting winding 15 therebetween affords this surge current protection.

The present invention has many advantages. One of these advantages is using the motor winding as a step-down device to give the correct low voltage efficiently and at no extra cost. Another advantage is that the solid state switch means 24 for the capacitor is at a tap 41 on the motor winding 15 rather than being across the line. This insures built-in di/dt protection via the leakage reactance of the tap node. This allows the ability to fire and refire the solid state switch 24 by means of a gate signal without destroying the unit and without the expense and complexity of a di/dt choke or reactor. It also allows firing of the switch means 24 by dv/dt or by exceeding blocking voltage. Due to the relatively high leakage reactance, the turn-on di/dt is so low that voltage firing is satisfactory and safe. This in turn allows the use of low voltage triacs sized to block only normal voltage. The prior art practice was to have excess voltage capability to prevent voltage firing since that would destroy the unit.

Due to the capacitor current leading the voltage by approximately 90°, the capacitor voltage is maximum at current zero. This results in the particular action of the circuit being such that after starting has been achieved and the switch means 24 ceases to be gated, the combination of capacitor volts and line voltage commence to add yielding up to double or more voltage on the switch 24. This present invention allows the switch to be fired on voltage, without di/dt destruction and since refiring the switch tends to lower the capacitor voltage in steps, the high voltage will ultimately disappear.

Another advantage of the invention is that the presence of leakage reactance at the tap 41 reduces the need for transient supression of dv/dt, and if necessary makes it easy to achieve. The particular arrangement of the circuit is designed to eliminate the need for isolation and isolating transformers. This simplifies the circuit and saves money.

The overload device 20 is preferably a series thermal protector which may be of the automatic reclosing type. Should there happen to be any false firing of the thyristor 60 during the starting condition, this could stall the motor, drawing overload current and the overload device will trip. Such series thermal protector 20 will cycle and proper starting will occur. Further advantages of the invention include the fact that the starting conditions for a particular motor may be customized by easy adjustment of control circuit parameters. Also the circuit may be used on a wide variety of horsepower sizes, speeds and voltages, whereas the prior art circuits generally required different switches for different speeds.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A motor circuit, comprising, in combination,
    a single phase motor having a main winding and a starting winding,
    first and second AC input terminals,
    means energizing said main winding from said input terminals,
    solid state switch means,
    a starting winding circuit connecting said starting winding to said solid state switch means and to said input terminals,
    condition sensing means sensing an electrical condition of said starting winding circuit and having an output,
    reference means,
    comparator means comparing the output of said condition sensing means and said reference means,
    and control means connected to effect conduction of said switch means for starting current through said starting winding circuit upon initial energization of said motor and controlled by said comparator means to terminate conduction of said solid state switch means upon said condition sensing means output exceeding said reference means.

2. A motor circuit as set forth in claim 1, wherein said control means includes means to establish continued cessation of current conduction through said solid state switch means once said condition sensing means output exceeds said reference means until the motor is deenergized.

3. A motor circuit as set forth in claim 1, wherein said control means includes a unidirectional conducting device normally biased into non-conduction by said control means upon initial energization of said motor.

4. A motor circuit as set forth in claim 3, wherein said control means establishes conduction of said unidirectional conducting device upon said condition sensing means output exceeding said reference means to short-circuit the control of said solid state switch means and hence terminate conduction thereof.

5. A motor circuit as set forth in claim 1, wherein said starting winding circuit includes a starting capacitor and a running capacitor, and said starting winding circuit connects said starting winding in series with said starting capacitor and said solid state switch means.

6. A motor circuit as set forth in claim 5, wherein said starting winding includes an intermediate tap to which said starting capacitor is connected,
    and means connecting said running capacitor to an end terminal of said starting winding to establish an inductive portion of said starting winding between said starting and running capacitors for surge current protection of said solid state switch means.

7. A motor circuit as set forth in claim 1, wherein said starting winding includes an intermediate terminal and first and second end terminals,
    and means connecting said condition sensing means to one of said terminals of said starting winding.

8. A motor circuit as set forth in claim 1, wherein said starting winding circuit directly connects said solid state switch means to one of said first and second AC input terminals.

9. A motor circuit as set forth in claim 8, including bypass means for said switch means, and wherein said one of said input terminals is directly connected to said bypass means.

10. A motor circuit as set forth in claim 1, wherein said starting winding includes an intermediate terminal and said condition sensing means is connected to said intermediate terminal.

11. A motor circuit as set forth in claim 1, wherein said control means includes an intermediate tap on said main winding,
    and biasing signal means connected for energization to said intermediate tap.

12. A motor circuit as set forth in claim 1, including a control electrode on said solid state switch means,
    said control means including bypass means for said control electrode effective upon bypass of current as controlled by said comparator means to establish cessation of current conduction through said solid state switch means.

13. A motor circuit as set forth in claim 1, wherein said reference means includes a break-down diode having a reverse break-down voltage.

14. A motor circuit as set forth in claim 1, wherein said reference means includes a unidirectional break-down diode having a reverse break-down voltage,
    and said comparator means connecting said break-down diode to said condition sensing means.

15. A motor circuit as set forth in claim 1, wherein said solid state switch means has a control electrode,
    said control means including biasing signal means connected to said control electrode to effect conduction of said switch means upon initial energization of said motor,
    said control means including bypass means for said control electrode effective on bypass of current therethrough to effect cessation of current conduction through said solid state switch means,
    and means in said bypass means establishing sufficient holding current from said biasing signal means to maintain continued cessation of current conduction through said solid state switch means until the motor is de-energized.

16. A motor circuit as set forth in claim 1, wherein said solid state switch means is a bidirectional conducting device having a control electrode,
    said control means including a unidirectional conducting device connected as a bypass means to said control electrode,
    said condition sensing means including unidirectional conducting means conducting only on half cycles of the AC input,
    said reference means including unidirectional reference means,
    and said comparator means comparing the unidirectional condition sensing means with the unidirectional reference means to control said unidirectional current conducting device to effect cessation of current in both directions through said solid state switch means.

17. A motor circuit as set forth in claim 1, including transformer means as a part of said condition sensing means obtaining a sensing voltage by transformer action from said starting winding.

18. A motor circuit as set forth in claim 1, wherein said motor circuit includes a capacitor, and said condition sensing means is connected across said capacitor.

19. A motor circuit as set forth in claim 1, wherein said starting winding circuit includes a starting capacitor, and said condition sensing means is connected across said starting capacitor.

* * * * *